United States Patent
Firko et al.

(10) Patent No.: US 10,308,343 B2
(45) Date of Patent: Jun. 4, 2019

(54) COMPOSITE HAT STIFFENER

(71) Applicant: The Boeing Company, Chicago, IL (US)

(72) Inventors: Jason Lawrence Firko, Wilmington, DE (US); Christopher Mazza, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 13/905,294

(22) Filed: May 30, 2013

(65) Prior Publication Data

US 2014/0356581 A1    Dec. 4, 2014

(51) Int. Cl.
| | | |
|---|---|---|
| *B29C 47/00* | (2006.01) | |
| *B64C 1/12* | (2006.01) | |
| *B29D 99/00* | (2010.01) | |
| *B64C 1/06* | (2006.01) | |
| *B64C 1/00* | (2006.01) | |

(52) U.S. Cl.
CPC .............. *B64C 1/12* (2013.01); *B29C 47/003* (2013.01); *B29D 99/0014* (2013.01); *B64C 1/064* (2013.01); *B64C 2001/0072* (2013.01); *Y02T 50/43* (2013.01); *Y10T 428/24479* (2015.01); *Y10T 428/24612* (2015.01)

(58) Field of Classification Search
CPC ........................ B29D 99/0007; B29D 99/0014; B64C 1/064; B64C 1/12; Y10T 428/24479; Y10T 428/24612; B29C 47/003
USPC .................................. 428/105, 156, 212, 213
See application file for complete search history.

(56) References Cited

U.S. PATENT DOCUMENTS

| | | |
|---|---|---|
| 6,290,282 B1 | 9/2001 | Hortlund et al. |
| 7,628,679 B2 | 12/2009 | Froeschner et al. |
| 7,854,874 B2 | 12/2010 | Martin et al. |

(Continued)

FOREIGN PATENT DOCUMENTS

| | | |
|---|---|---|
| CN | 101827749 A | 9/2010 |
| DE | 102007033868 | 1/2009 |

(Continued)

OTHER PUBLICATIONS

Extended European Search Report dated Oct. 7, 2014 from EP Application No. 14164751.1.

(Continued)

*Primary Examiner* — Megha M Gaitonde
(74) *Attorney, Agent, or Firm* — Miller, Matthias & Hull LLP

(57) ABSTRACT

A hat stiffener disclosed herein that includes a web portion having locally optimized slopes. The hat stiffener may include a web portion having a relatively small slope optimized to handle a sheer force. The hat stiffener may further include a web portion having a relatively large slope optimized to handle a pull-off or interface force. The hat stiffener may include a hat cap having variable widths along the length of the hat stiffener. The hat stiffener may further include a transitional web portion to transition from a web portion having a relatively large slope to a web portion having a relatively smaller slope. The concepts disclosed herein allow for the generation of a one-piece hat stiffener, which can be locally optimized to improve structural capability and efficiency for different loading applications.

18 Claims, 11 Drawing Sheets

(56) References Cited

U.S. PATENT DOCUMENTS

| | | |
|---|---|---|
| 7,871,040 B2 | 1/2011 | Lee et al. |
| 7,897,004 B2 | 3/2011 | Engwall et al. |
| 2008/0066983 A1 | 3/2008 | Kimoto et al. |
| 2010/0052367 A1* | 3/2010 | Miyashita ............... B62D 25/04 296/203.03 |
| 2010/0181428 A1 | 7/2010 | Noebel et al. |
| 2011/0084428 A1 | 4/2011 | Wade et al. |
| 2011/0139932 A1 | 6/2011 | Matheson et al. |

FOREIGN PATENT DOCUMENTS

| | | |
|---|---|---|
| DE | 102007033868 A1 | 1/2009 |
| EP | 2 433 781 | 3/2012 |
| EP | 2433781 A2 | 3/2012 |
| EP | 2781450 A1 | 9/2014 |
| JP | 2009113797 A | 5/2009 |
| JP | 2010274910 A | 12/2010 |
| JP | 2012071600 A | 4/2012 |

OTHER PUBLICATIONS

Canadian Office Action from Application Serial No. 2,845,742 dated Mar. 27, 2015; 3 pages.
Canadian Office Action from Application Serial No. 2,845,742 dated Feb. 11, 2016, 5 pages.
European Office Action from EP Application Serial No. 14164751.1 dated May 17, 2016, 5 pages.
Chinese Office Action for Related Patent Application No. 201410204220.6; Report dated Feb. 23, 2017.
Examination Report for Application No. 2014201363, reported dated Mar. 2, 2017.
Examination Report for related Gulf Cooperation Council Patent Application No. 2014-27262; report dated Feb. 28, 2018.
Search Report for related European Application No. EP17198687.0; report dated Mar. 8, 2018.
Japanese Office Action for Related Patent Application No. 2014-093178; Report dated Feb. 27, 2018.

* cited by examiner

COMPOSITE HAT STIFFENER

BACKGROUND

Composite aircraft structures offer many advantages for the commercial aircraft industry. Composite airframes can be lighter and/or stronger than airframes constructed from materials such as aluminum. Composite aircraft skin can be designed to be lightweight and flexible. As with other aircraft designs, composite aircraft structures are subjected to various forces during the operation of the aircraft. Reinforcing mechanisms are commonly used at strategic locations with respect to the composite aircraft structures to absorb and distribute these operational forces in order to maintain the structural integrity of the aircraft.

One type of reinforcing mechanism is a stiffener. A stiffener is a strip of material that transfers forces imparted on the skin to the frame in the fuselage portion of the aircraft and to the ribs, the spars in the wing portion of the aircraft, and to the beams on a bulkhead structure. Stiffeners can provide torsional rigidity, bending stiffness, and buckling resistance in composite structures for many aircraft applications. The stiffeners can allow for a reduction in the thickness of the skin, while providing a level of strength and rigidity necessary for the safe operation of the aircraft.

Conventional stiffener designs vary from manufacturer to manufacturer and from aircraft to aircraft. In a composite aircraft, stiffener designs can take the form of a hat stiffener, which may be open or closed. Other stiffener designs may include, but are not limited to, an "I" stiffener, or a "J" stiffener. In order to maintain aircraft structural integrity, the stiffener is typically designed to account for the forces described above. Conventional stiffener design and manufacturing constraints often result in sub-optimal performance for some loading conditions and potential overdesign for other conditions. For example, traditional hat stiffeners often have a constant hat web angle. Near vertical hat stiffener webs are better for interface load transfer but may need to be bolstered by stringer-end fittings that can help to mitigate torsion issues resulting from the shear lag force. A hat stiffener with a less steep hat web angle would more efficiently handle shear lag, but may need to be reinforced at pull-off interfaces with radius fillers or angle fittings.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to limit the scope of the claimed subject matter.

According to one aspect of the disclosure herein, a hat stiffener is provided. The hat stiffener may include a hat cap having a hat cap length, one or more hat flanges along the hat cap length, and a hat web. The hat web may include a first slope along the hat cap length and a second slope along the hat cap length. The second slope may be greater than the first slope.

According to another aspect, a composite structure is provided. The composite structure may include a composite skin and one or more hat stiffeners affixed to the composite skin. The one or more hat stiffeners may include a hat cap having a hat cap length, one or more hat flanges along the hat cap length, and a hat web. The hat web may include a first slope along the hat cap length and a second slope along the hat cap length. The second slope may be greater than the first slope.

According to yet another aspect, a method of forming a hat stiffener is provided. The method may include providing a mandrel having a first hat web slope along the hat cap length and a second hat web slope along the hat cap length. The second hat web slope may be greater than the first hat web slope. The method may further include providing a composite material, placing the composite material in the mandrel, curing the composite material, and removing the composite material to provide a hat stiffener having locally optimized hat web slopes.

The features, functions, and advantages discussed herein can be achieved independently in various embodiments of the present disclosure or may be combined in yet other embodiments, further details of which can be seen with reference to the following description and drawings.

DETAILED DESCRIPTION

Figure 1:
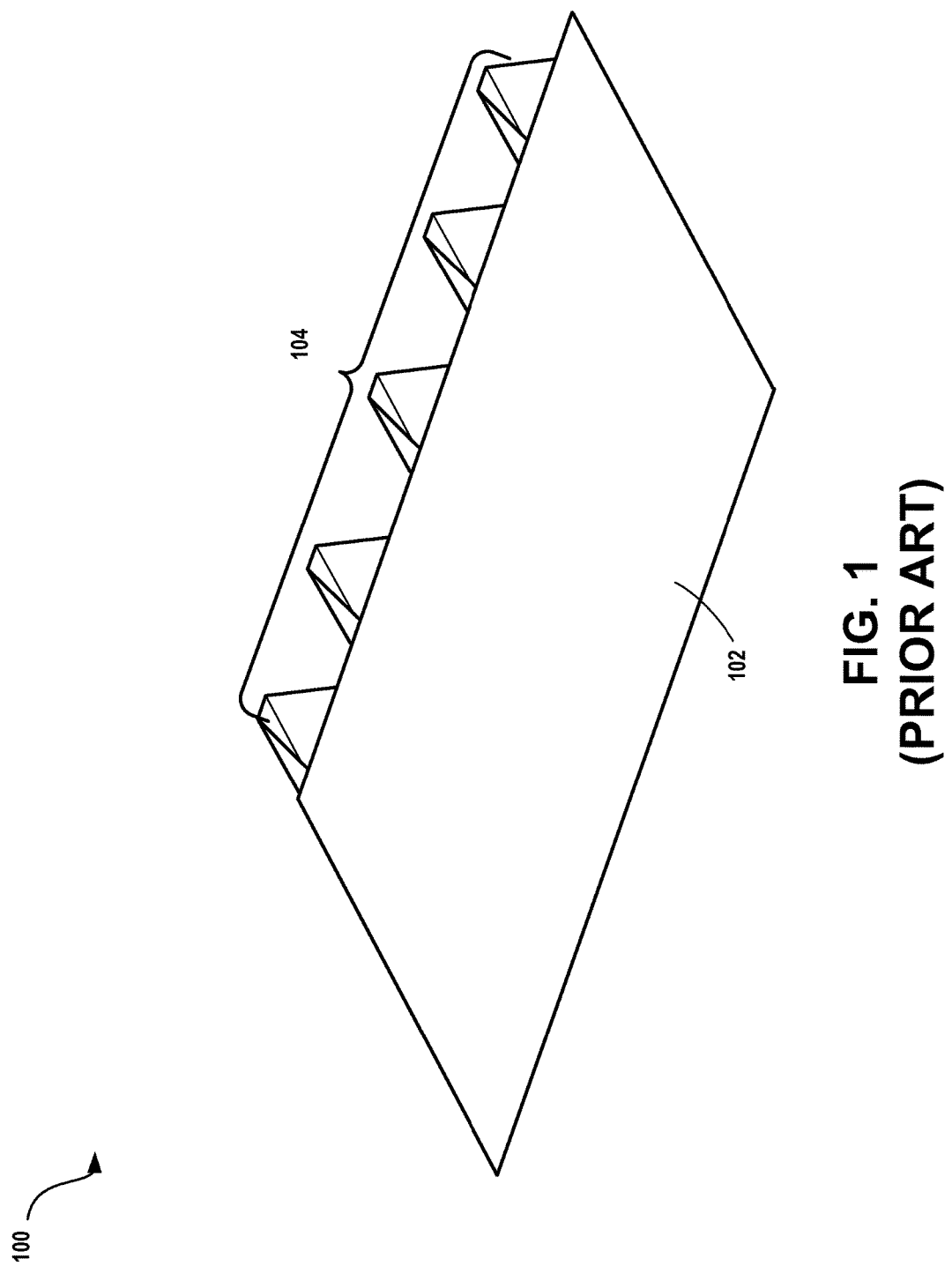
FIG. 1 is a perspective view of a portion of a conventional composite fuselage structure.

The following detailed description is directed to a hat stiffener that incorporates a variable hat web slope along the hat cap length of the hat stiffener. The incorporation of a variable hat web slope can provide for a hat stiffener with near-vertically sloped hat webs at pull-off interfaces. The variable hat web slope can also provide for a more gradually sloped hat web at the terminations, or run-outs, at the end of the stiffener, or in the area in which vertical webs are not necessary. In some configurations, the near-vertical hat web slopes can reduce the offset between the interface load applied to the flange of the hat and the load path provided by the hat webs to carry this out of plane load to the surrounding structure. The reduction in offset can reduce the induced radius bending at the interface. As a result, interlaminar tension loading may be reduced at the pull-off interfaces.

The more gradually sloped webs in the run-outs can provide a load path for in-plane shear, from the cap of the stiffener back to the skin, prior to the stiffener terminating. Providing a load path for in-plane shear can reduce the amount of shear lag that builds up, possibly leading to radius bending and interlaminar tension failures in the stiffener run-outs. Mandrel geometry can be varied to manufacture a stiffener according to various aspects described herein.

The composite plies forming a hat stiffener can be laid up in the same fashion as a traditional hat stiffener and draped into the mandrel tool, bagged and cured. The stiffeners could then be fastened, bonded or co-bonded to a bulkhead or skin. In some configurations, no additional parts may be required, possibly reducing part count, assembly time, and analysis effort by reducing or eliminating the need to attach additional run-out fittings, or pull-off interface fittings/radius fillers.

In the following detailed description, references are made to the accompanying drawings that form a part hereof, and in which are shown by way of illustration specific embodiments or examples. Referring now to the drawings, in which like numerals represent like elements throughout the several figures, aspects of a hat stiffener that incorporates variable hat angles and other aspects will be presented.

Referring now to FIG. 1, a portion of a prior art, conventional composite fuselage structure 100 is illustrated. The fuselage structure 100 can include a skin 102. The skin 102 is typically a composite matrix formed from several layers of plies. The plies can include several layers of material that, when cured, form the skin 102. Hat stiffeners 104 attached to the underside of the skin 102 provide structural support to the skin 102. The combination of the skin 102, constructed from a composite matrix, and the hat stiffeners 104, which may also be constructed from a composite matrix, can provide the fuselage structure 100 that may be structurally sturdy yet relatively lightweight.

Figure 2:
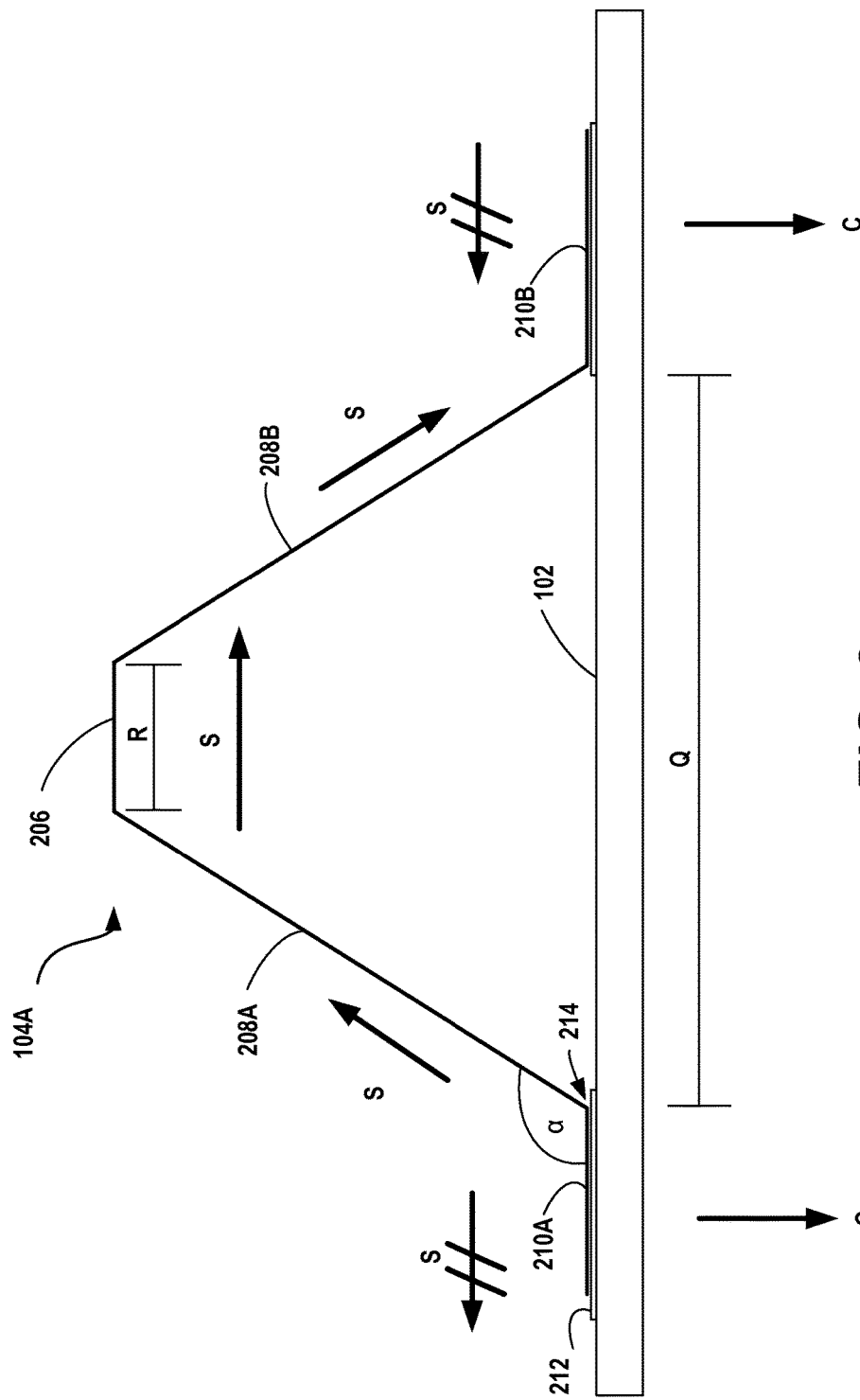
FIG. 2 is a cross-sectional view of a conventional composite fuselage structure using a conventional hat stiffener.

FIG. 2 is a cross-sectional view of one of the hat stiffeners 104, illustrated as hat stiffener 104A. The hat stiffener 104A is formed from various components that together act to provide structure support to the skin 102. The components include a hat cap 206, a hat web 208A, 208B and hat flanges 210A, 210B. In some configurations, the hat cap 206 is connected to a frame of an aircraft (not shown). The hat cap 206 may provide bending stiffness to the stiffener 104A. The hat webs 208A, 208B may offset the hat cap 206 from the skin 102, increasing the hat webs' 208A, 208B contribution to bending stiffness. Further, the hat webs 208A, 208B may also provide an out-of-plane shear resistance, allowing the hat stiffener 104A to transfer loads to surrounding structure. In some configurations, the hat cap 206 may also absorb in-plane shear. The hat webs 208A, 208B can provide a load path to transfer in-plane shear between the skin 102 and the hat cap 206 and the hat cap 206 and the skin 102.

In other configurations, the hat cap 206 can be connected to another composite structure, such as a second layer of skin (not shown). In some implementations, the frame may be mouse holed and step over the hat fastening into the flanges, or a beam would be mounted to the other side of the skin and then attached to the hat by fastening through the attached flanges. In some implementations, the hat cap 206 may be attached, however this is typically avoided as it is difficult to inspect anything attached to the cap of a hat.

The hat web 208A, 208B forms the support structure between the hat cap 206 and the hat flanges 210A, 210B. The hat flanges 210A, 210B connect one side of the hat stiffener 104A to a part of the aircraft, such as the skin 102. The hat flanges 210A, 210B may be integrally formed with the skin 102 or may be affixed to the skin 102 through the use of an adhesive 212 or other bonding or affixing technology.

The spacing Q between the inner surfaces of the flange 210A and flange 210B in relation to the length R of the hat cap 206 provide for a stiffener web angle $\alpha$. The stiffener web angle $\alpha$ can influence how forces are transferred from the skin 102 to the hat cap 206, and onto other structures in an aircraft for load dissipation. The hat cap 206 acts as a force transfer mechanism to transfer forces from the hat web 208, which in turn transfers forces from the web flange 210. The hat stiffener 104A can be subjected to various forces in multiple vectors.

For example, the hat stiffener 104A may be subjected to pull-off force C, which is load force having a direction indicated in FIG. 2. In one configuration, a desired transfer path for the pull-off force C is from the skin 102, through the hat stiffener 104A, and through other various structures, ending at a frame of the aircraft. The hat stiffener 104A may also be subject to a shear force S, which is a force that runs generally normal to the pull-off force C. This shear force S may be a reaction in the hat cap 206 due to shear in the skin 102 and the hat flanges 210A, 210B. Because of this reaction, the shear force S present on the hat cap 206 has an opposite vector to the shear force S present in the skin 102 (demonstrated by two slashes through the force vector on the skin 102). This shear may build up in the hat cap 206, also called shear lag, and then get reacted out at the end of the hat stiffener 104A. At the end of the hat stiffener 104A, the hat cap 206 may be experience torque, thus requiring the total shear force S to be moved from the hat cap 206 back into the skin 102, causing radius bending issues, discussed in more detail below. In one configuration, a desired transfer path for the shear force S may be from the skin 102, into the hat flange 210A, through the hat web 208, the hat cap 206, back to the hat flange 210B and back onto the skin 102.

The magnitude of the pull-off force C in comparison to shear force S may vary depending on the location of the hat stiffener 104A in the aircraft, or the location along the length of a particular hat stiffener, as well as the particular operation of the aircraft, such as when changing directions, increasing altitude or decreasing altitude, application of cabin pressure, as well as other factors. The web angle $\alpha$ has an impact as to how well the hat stiffener 104A performs when transferring the various forces. For example, a small web angle $\alpha$, translating to a relatively large hat web slope, may provide for a better transfer of the pull-off force C, while not transferring the shear force S as well. However, in the same manner, with a relatively small web angle $\alpha$, the ability of the hat stiffener 104A to withstand the shear force S at a radius 214 of the hat stiffener 104A may be less than optimal. This can lead to interlaminar tension failures in the radius 214 caused by radius bending, resulting in a structural breakdown of the hat stiffener 104A.

While conventional hat stiffeners may use additional components to compensate for the forces acting on the hat stiffener, various configurations of the subject matter described herein use differing hat web slopes in the hat stiffener. As used herein, the hat web slope is the gradient of a line beginning at the intersection of the hat web and the hat flange and ending at the intersection of the hat web and the hat cap. A hat web slope may be described herein in terms of a hat web angle, but may also be described in relative terms to another hat web slope. The hat web slope at a particular location of the hat stiffener can be configured based on the performance requirements of the hat stiffener at the particular location. It should be understood that the slopes, angles, and general shapes of the hat stiffeners described herein are exemplary only. Further, the present disclosure is not limited to any specific determination of a degree of slope, as the slopes are relative in nature. The use of the terms "larger" and "smaller" are relative terms.

Figure 3:
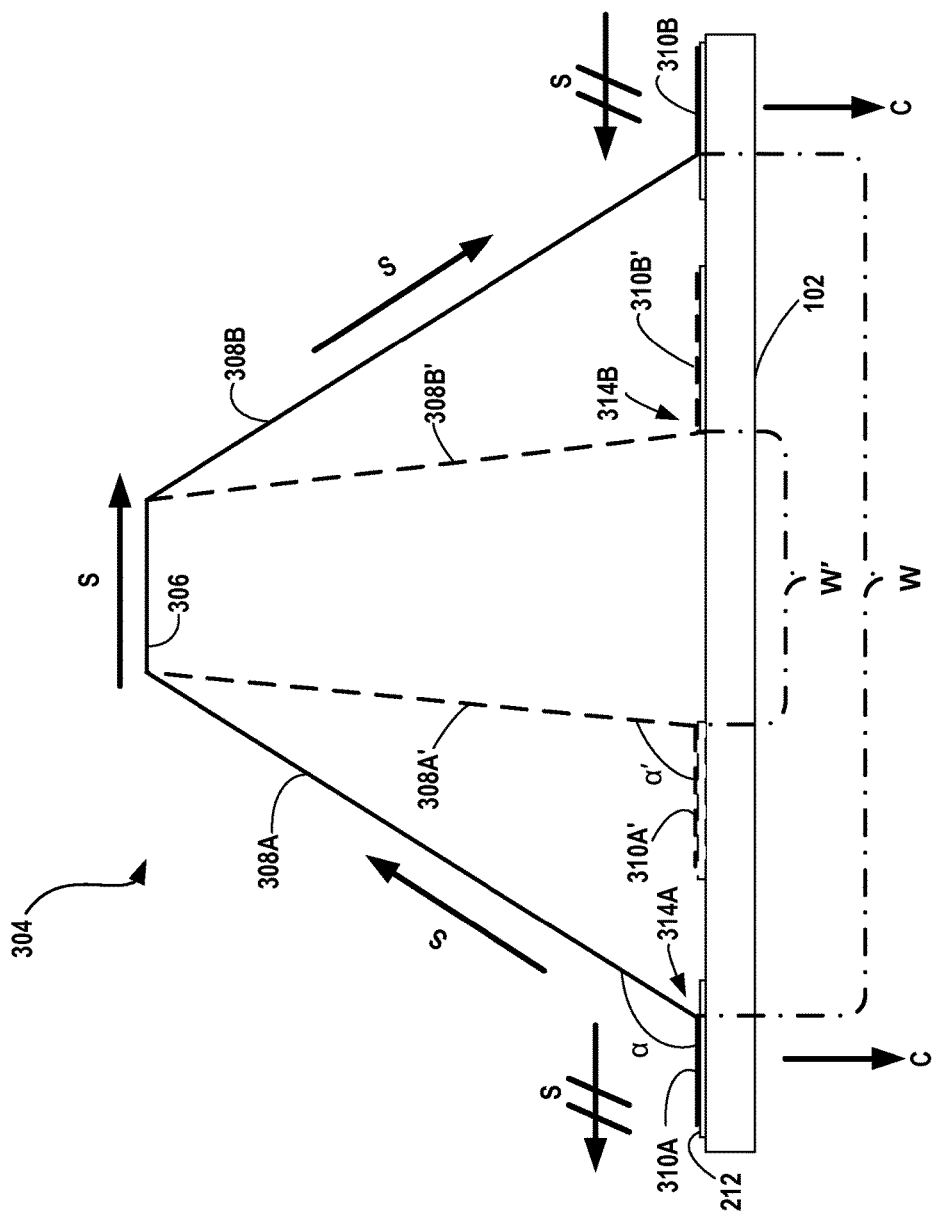
FIG. 3 is a cross-sectional view of a composite fuselage structure using a locally optimized hat stiffener, according to embodiments presented herein.

Referring now to FIG. 3, a cross-sectional view of an illustrative hat stiffener 304 with varying web angles to provide varying hat web slopes is illustrated. The hat stiffener 304 has web angle α at one location along its length and web angle α' at another location along its length, described in additional detail in FIGS. 4-6 below. The web angle α may provide for a first hat web slope, while the web angle α' may provide for a second hat web slope. Implementations of the presently disclosed subject matter may include two or more hat web slopes. As illustrated in FIG. 3, the first hat web slope is less than the second hat web slope. As discussed above, a relatively large web angle, such as the web angle α, can transfer the shear force S between the hat flanges 310A and 310B and the hat cap 306 via the hat webs 308A and 308B better than a relatively smaller web angle, such as the web angle α'.

In the portion of the hat stiffener 304 where it is desired to account for the pull-off force C to a greater degree than the shear force S, the hat stiffener 304 has a web angle α' providing for the second hat web slope. In this configuration, the pull-off force C may be effectively transferred from the hat flanges 310A' and 310B', illustrated in more detail in FIG. 4 below, to the hat webs 308A' and 308B', which may transfer the load to another structural component of an aircraft. The radius 314B may be better able to withstand the pull-off force C because the smaller web angle α' causes less moment to be applied to the radius 314B, causing increased radius bending and interlaminar tension, when compared to the radius 314A.

In the portion of the hat stiffener 304 where it is desired to account for the shear force S to a greater degree than the pull-off force C, the hat stiffener 304 has a web angle α, providing for a second hat web slope, which may have a hat web slope less than the hat web slope provided by the web angle α'. In this configuration, the shear force S may be effectively transferred between the skin 102 and the hat cap 306 via the hat webs 308A and 308B. The radius 314A may be better able to withstand the shear force S than the radius 314B because the larger web angle α' causes less moment to be applied to the radius 314A, and therefore decreased radius bending and interlaminar tension, when compared to the radius 314B in a shear force S situation.

The hat stiffener 304 may be attached to the skin 102 using conventional attachment means. For example, the hat stiffener 304 may be affixed to the skin 102 through the use of the adhesive 212. Other affixing technologies may be used depending on the materials used to form the various components described herein, including fastening, bonding, co-bonding, co-curing, welding and riveting. The present disclosure is not limited to any particular technology for affixing the hat stiffener 304 to the skin 102. Other hat stiffeners, including hat stiffeners constructed according to the concepts described herein, may be affixed to the skin 102 to form a portion of a composite structure for use in an aircraft.

The varying web angles may also provide for varying internal widths. In FIG. 3, a first internal width W corresponds to the web angle α. Also shown is a second internal width W' that corresponds to the web angle α'. As various components of the hat stiffener 304 are modified, the internal width of the hat stiffener 304 at various locations may vary from the first internal width W to the second internal width W'. It should be understood that the first internal width W and the second internal width W' are shown as being measured at a location near the base of the hat flanges 310A and 310B, however, the first internal width W and the second internal width W' may be measured at various locations along the hat stiffener. Further, it should be understood that an internal width of the hat stiffener 304 may be varied in ways other than a through changes in a web angle.

Figure 4:
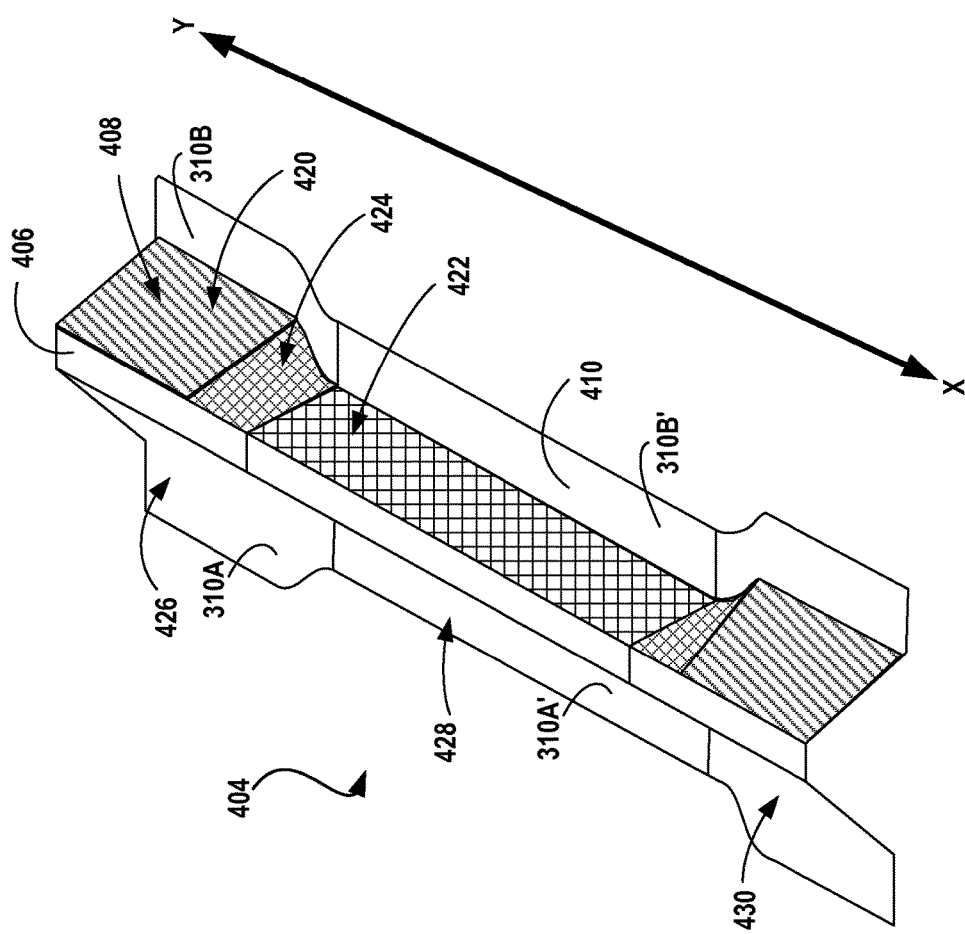
FIG. 4 is a perspective view of a hat stiffener, according to embodiments presented herein.

FIG. 4 is an illustration of a hat stiffener 404 having multiple hat web slopes along the length of the hat stiffener 404. The hat stiffener 404 in FIG. 4 has a hat cap 406, a hat web 408 and a hat flange 410. The hat web 408 has various slopes along a hat cap length XY of the hat stiffener 404. The various slopes, described in more detail below, can help the hat stiffener 404 transfer loads more effectively. For example, in areas of high sheer force S, the slope of the hat web 408 may be relatively small in order to reduce the amount of moment felt at the radii of the hat stiffener 404. In another example, in areas of high pull-off force C, the slope of the hat web 408 may be relatively larger to better transfer the pull-off force C.

A first hat web slope of the hat stiffener 404 is the web area 420 with the web flanges 310A and 310B. The web area 420 is illustrated as having a relatively smaller hat web slope, similar to the hat web slope provided by the web angle α of FIG. 3. As described above, because the web angle α provides for a smaller slope than when compared to the web angle α', the portion of the hat stiffener 404 having that web angle is configured to handle the sheer force S more effectively than a hat stiffener with a slope provided by the web angle α'. The ability to handle the sheer force S may be useful in locations that are impacted by a higher degree of the sheer force S in comparison to the pull-off force C. For example, the hat stiffener portion 426 may be more efficient in a region in which the sheer force S is a greater contributor of force than the pull-off force C.

At some locations there may be local out of plane loads applied to the hat stiffener 404, such as a tension/pull-off load at a bracket attachment. For example, a hat stiffener portion 428 may be in a portion of the aircraft where a beam is attached on the other side of the panel, or a bracket is attached, and the like, which may cause the application of a discrete interface load. In this configuration, the hat stiffener portion 428 may have a slope provided by the hat web angle α' with hat flanges 310A' and 310B'. In this configuration, the hat stiffener 404 may be better configured to handle the effects of the pull-off interface force C than the sheer force S.

The hat stiffener 404 may also have a transition area, hat web area 424, between the hat web area 420 and the hat web area 422. The hat web area 424 may have a web with a transitional slope of varying degrees along its length to allow for a transition from the smaller slope of the hat web area 420 to the larger slope of the hat web area 422. Although the present disclosure is not limited to any particular benefit, a transition between the smaller slope of the hat web area 420 to the larger slope of the hat web area 422 may help increase the structural integrity of the hat stiffener 404 by reducing sharp angles.

For example, when manufactured using composite materials, sharp transitions in angles from one surface to another can lead to stress concentrations, and interlaminar stresses, especially at a bend between two surfaces. Providing the hat web area 424 can reduce the effects of the transition while still providing the structural rigidity necessary to perform properly. It should be understood that the present disclosure is not limited to any particular relative hat stiffener portions, as some hat stiffeners may be manufactured with fewer or more hat stiffener portions, illustrated by way of example, in FIG. 5.

Figure 5:
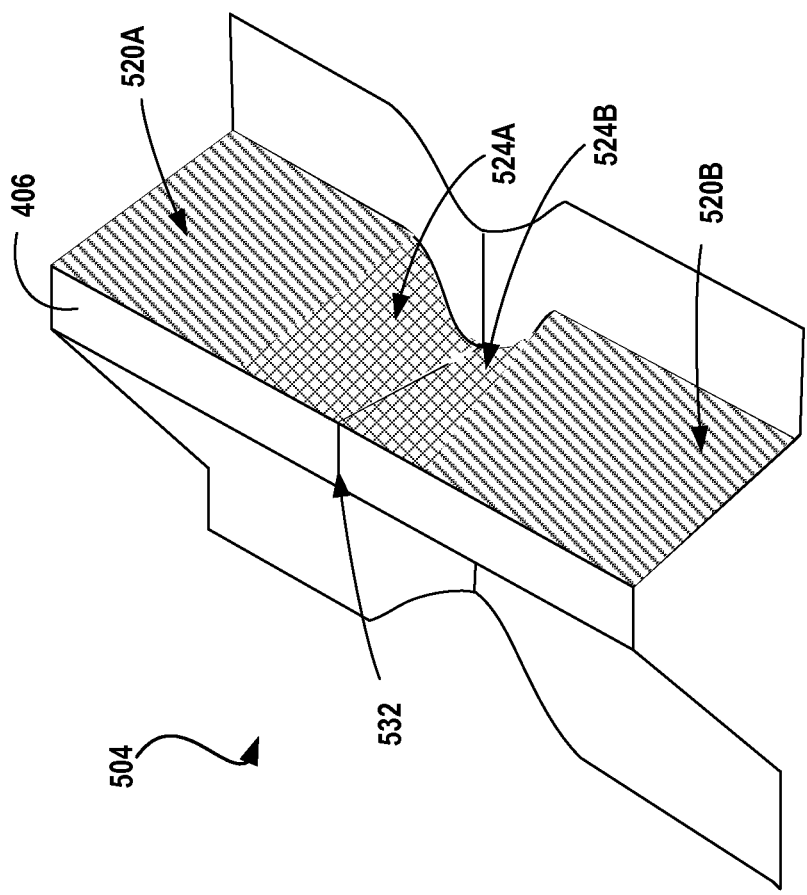
FIG. 5 is a perspective view of an alternative hat stiffener, according to embodiments presented herein.

FIG. 5 is a perspective view of a hat stiffener 504 having fewer web slopes than the hat stiffener 404 of FIG. 4 and a constant width for the hat cap 406. The hat stiffener 504 has hat web area 520A. The hat web area 520A has a relatively smaller slope, similar to the hat web area 420 of FIG. 4. The hat web area 520A transitions from a smaller slope into a larger slope via hat web area 524A, which provides for a large slope at location 532. Thus, the slope of the hat stiffener at a location 532 is greater than the slope at the hat web area 520A. The profile of the hat stiffener 504 continues from the hat web area 524A to a hat web area 524B, which is a transition from the large slope at the location 532 to the hat web area 520B. The hat web area 520B may have a slope similar to the hat web area 520A.

It should be noted that the transition portions, such as the hat web areas 524A and 524B, may not have a particular shape. For example, while the hat web area 424 of FIG. 4 and the hat web areas 524A and 524B of FIG. 5 are shown having a generally concave shape, other configurations may provide for a convex shape. Additionally, various configurations may provide for a variable hat cap size, an example of which is illustrated in FIG. 6.

Figure 6:
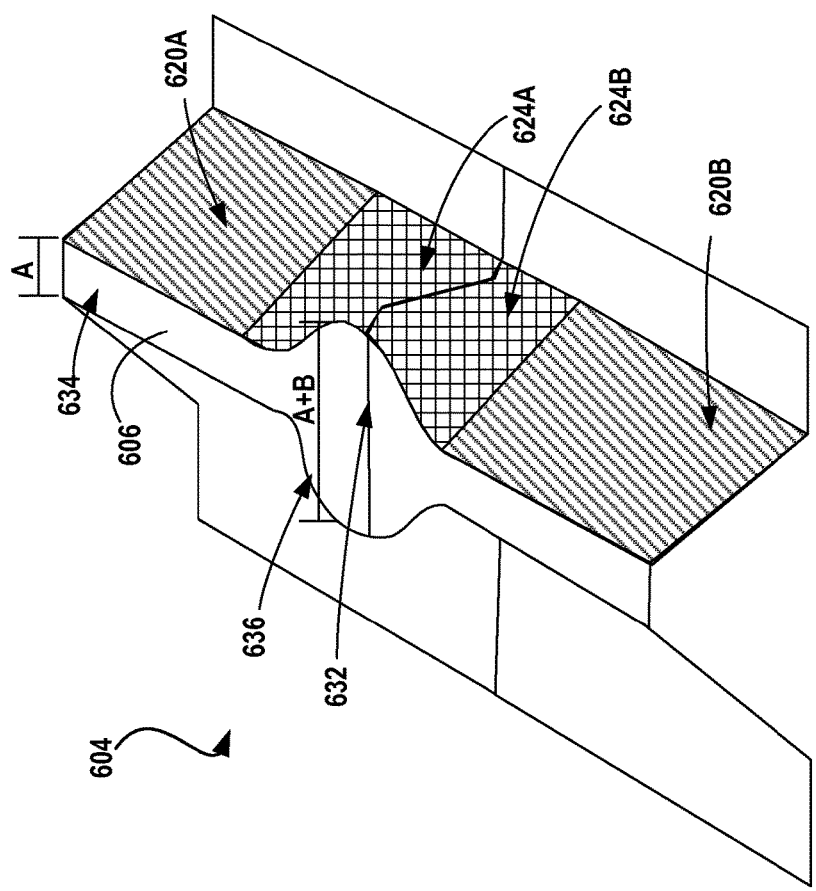
FIG. 6 is a perspective view of an alternative hat stiffener, according to embodiments presented herein.

In FIG. 6, a hat stiffener 604 has a hat web area 620A and a hat web area 620B, both of which may have slopes similar to the hat web areas 520A and 520B of FIG. 5. As in some configurations discussed herein, it may be desirable to have a hat stiffener with a web angle optimized to handle the pull-off load C rather than the sheer load S. In that configuration, the hat stiffener 604 has hat web areas 624A and 624B, which transition the slope from the hat web areas 620A and 620B to the slope found at a location 632, which may have a larger slope than the hat web areas 620A and 620B.

In FIG. 6, the hat web areas 624A and 624B transition to the larger slope via a convex configuration, in a manner different than the concave transition that may be found in FIGS. 4 and 5. In the configuration of FIG. 6, the convex transition provides for a hat cap 606 with variable size along its length. For example, the hat cap 606 may have a portion 634 near the end of the hat cap that has a width of A, whereas the hat cap 606 may have a portion 636 near the location 632 that has a width of A+B. Although not limited to any particular benefit, the location 636, which has a width greater than the location 634, may provide additional benefits. For example, the location 636 may provide additional surface area necessary to withstand a particular load. In another example, the location 636 may provide a better transition from the hat stiffener 604 when optimized to handle the sheer force S to the hat stiffener 604 when optimized to handle the pull-off load C.

Figure 7:
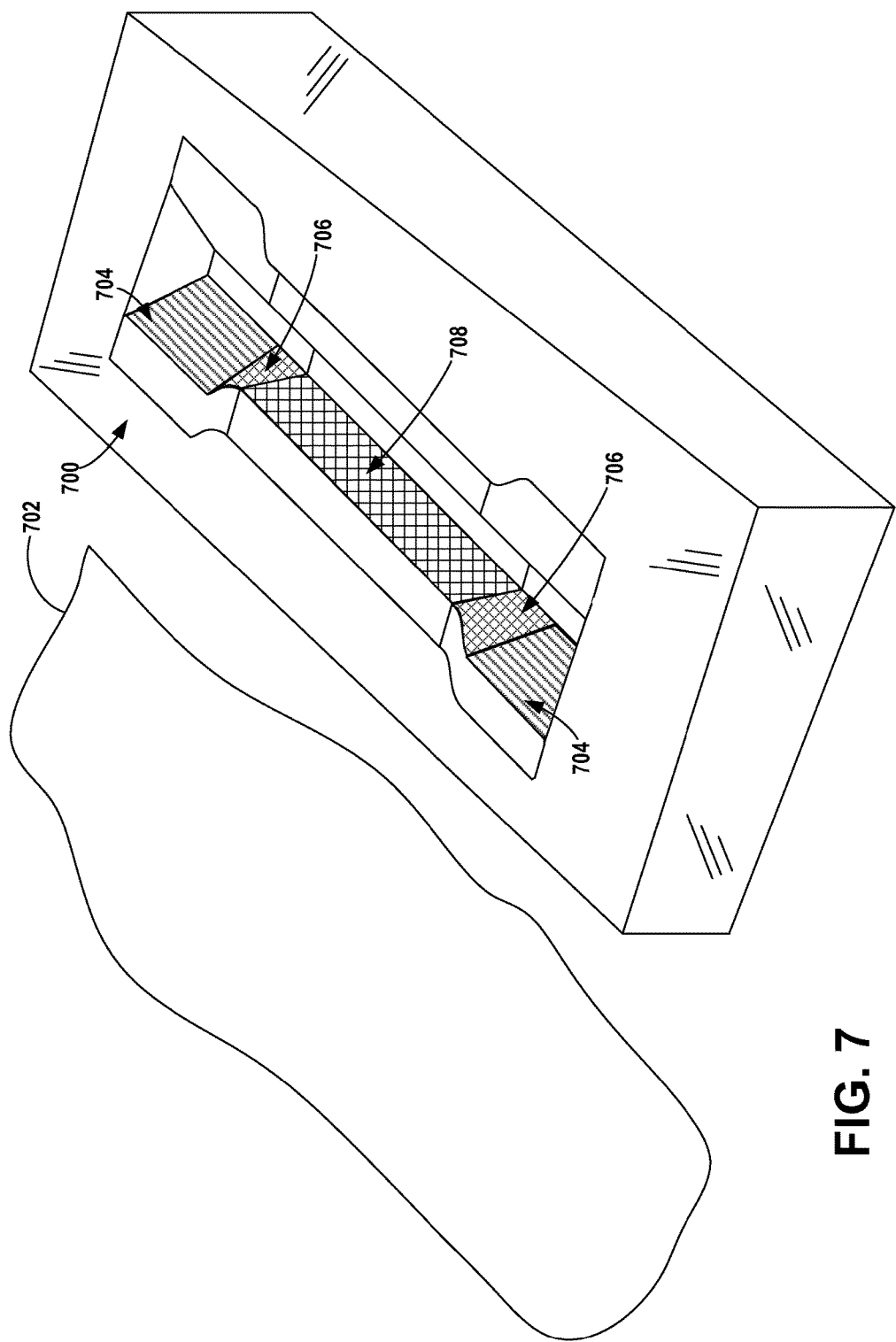
FIG. 7 is a perspective view of a mandrel that may be used to form a hat stiffener, according to embodiments presented herein.

FIG. 7 is an illustration of a mandrel 700 that may be used to form a hat stiffener, according to the various embodiments described herein. The mandrel 700 may be shaped to receive one or more layers of composite material 702. The composite material 702 may be a laminate formed from various types of materials. The concepts described herein are not limited to any particular laminate of materials.

As illustrated in FIG. 7, the mandrel 700 has various slopes that, when used to form a hat stiffener according to various configurations described herein, forms a hat stiffener with various slopes. The mandrel 700 has an area 704, which may be used to form a hat stiffener portion with a smaller slope, such as the hat web area 420 of FIG. 4. The mandrel 700 may also have transition area 706, which increases the slope of a hat stiffener from the slope of the area 704 to the slope of an area 708. The composite material 702 may be placed in the mandrel 700 and formed by conventional curing techniques. It should be understood that the mandrel 700 may be formed from one or more pieces or may be of unitary construction, the technology of which is not limited to any particular configuration.

Figure 8:
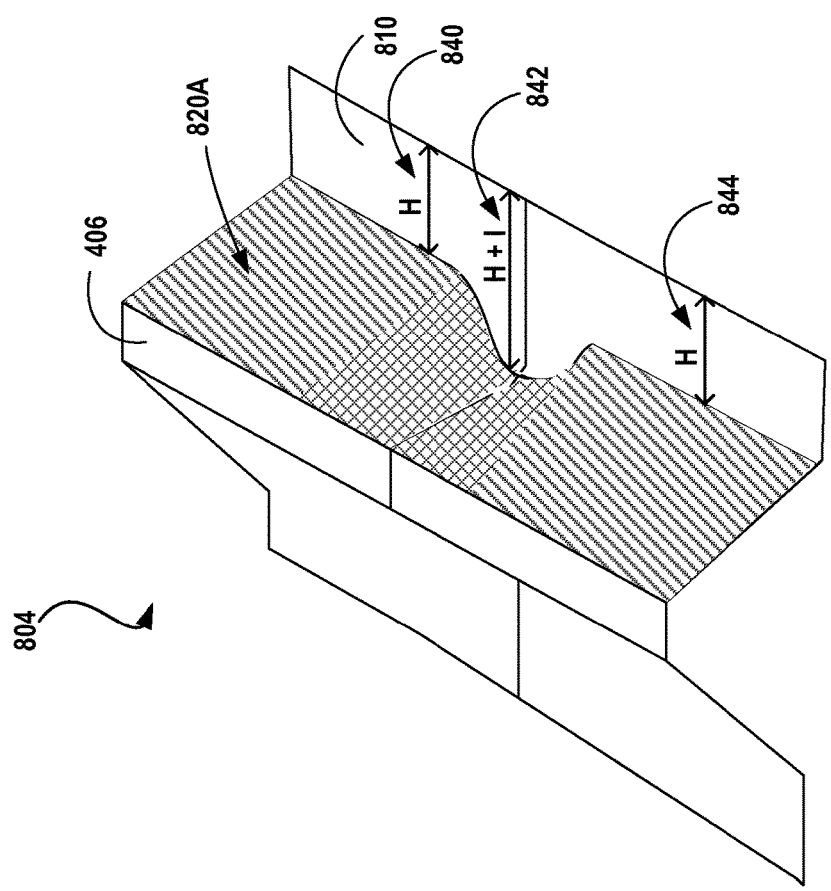
FIG. 8 is a perspective view of a mandrel with variable flange lengths, according to embodiments presented herein.

FIG. 8 is an illustration of a hat stiffener 804 having flanges with various widths. Although the presently disclosed subject matter is not limited to any particular benefit or advantage, in some implementations, variable widths can provide some functionality. For example, in locations in which the shear force S or the pull off force C may be relatively large, a wider hat flange may provide additional surface area in which the hat stiffener 804 may be attached to the skin 102.

Illustrating one exemplary embodiment, the hat stiffener 804 has a hat flange 810 with variable widths along the length of the hat flange 810. At location 840 of the hat flange 810, the hat flange 810 has a width of "H". At location 842 of the hat flange 810, the hat flange 810 has a width of "H+I". As illustrated, the width "H+I" is wider than the width "H". At location 844, the hat flange 810 has a width of "H". It should be appreciated that the present disclosure is not limited to any specific order of variation of the width of the hat flange 810. For example, the implementation illustrated in FIG. 8 shows a hat flange 810 having a width profile in which the width near the distal ends of the hat stiffener 804 are similar. These and other configurations are considered to be within the scope of the present disclosure.

Figure 9:
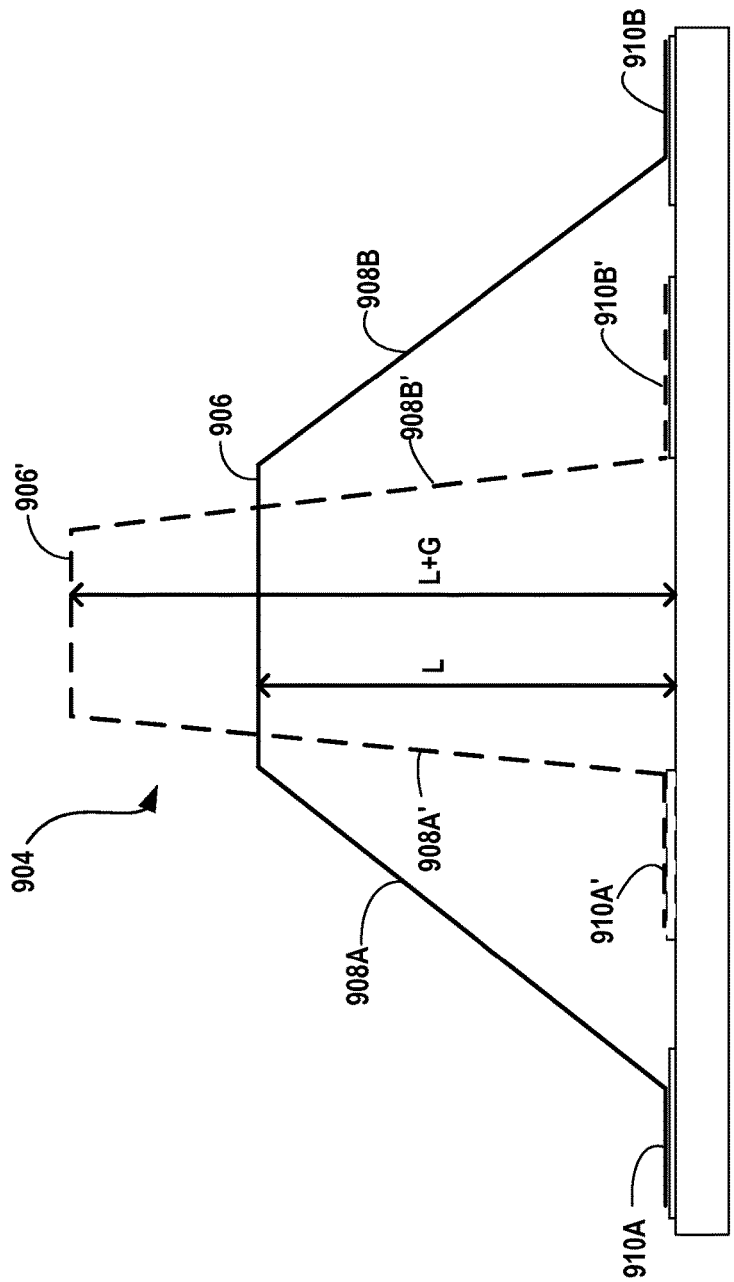
FIG. 9 is a cross-sectional view of a composite fuselage structure with variable hat heights, according to embodiments presented herein.

FIG. 9 is a cross-sectional view of a hat stiffener 904 with variable hat heights. The hat stiffener 904 includes a hat cap 906, hat webs 908A and 908B, and hat flanges 910A and 910B. As discussed above in relation to FIG. 3, the hat web slope of the hat stiffener 904 may be changed. In the implementation illustrated in FIG. 9, the height of the hat cap has been modified to accommodate for the variable hat web slope. A hat web slope provided by the hat cap 906, the hat webs 908A and 908B, and the hat flanges 910A and 910B provides for a hat height of "L". Instead of maintaining a constant hat height, the hat height may be increased or decreased. For example, hat stiffener 904 has a hat height of "L+G" provided by the hat cap 906', the hat webs 908A' and 908B', and the hat flanges 910A' and 910B', which is a larger hat web angle than the hat web slope providing the hat height of "L". Other components of the hat stiffener may be varied. For example, the thickness of the hat stiffener 904 or its constituent components, such as, but not limited to, the hat web 908A and 908B, the hat cap 906 and the hat flanges 910A and 910B.

Figure 10:
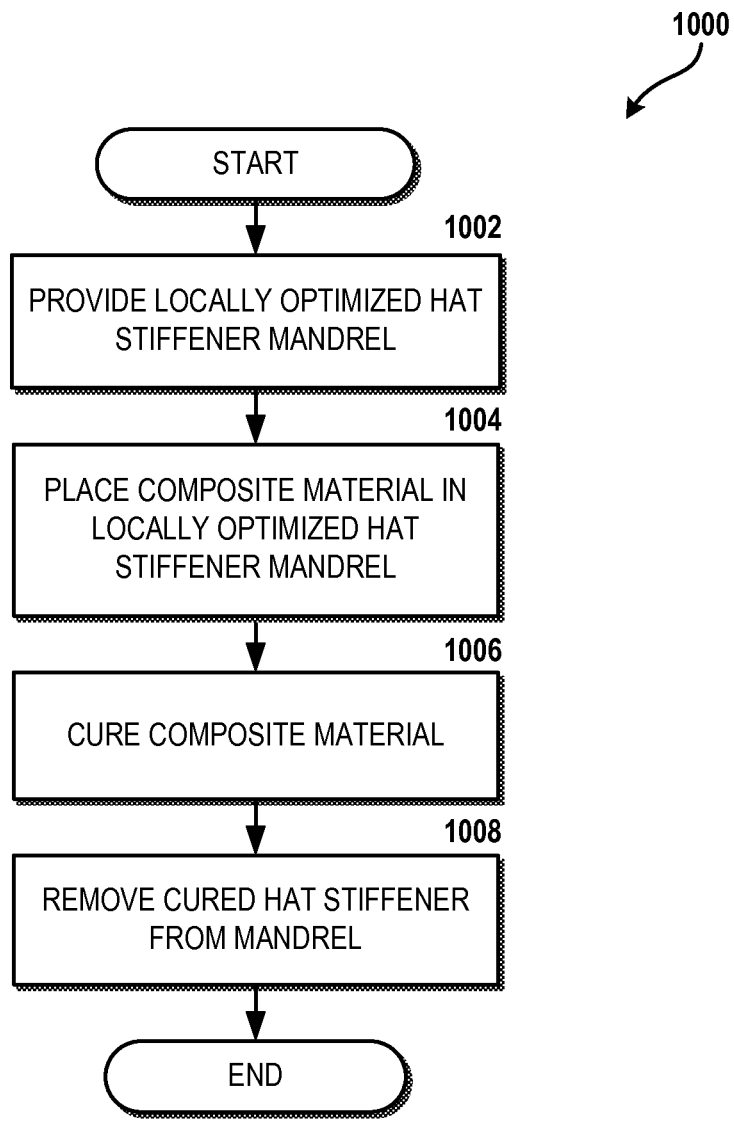
FIG. 10 is an exemplary method for forming locally optimized composite hat stiffeners, according to embodiments presented herein.

Turning now to FIG. 10, an illustrative routine 1000 for forming a hat stiffener with locally optimized hat web slopes is provided herein. Unless otherwise indicated, it should be appreciated that more or fewer operations may be performed than shown in the figures and described herein. Additionally, unless otherwise indicated, these operations may also be performed in a different order than those described herein The routine 1000 starts at operation 1002, where a mandrel 700 is provided. To provide for locally optimized hat web angles, the mandrel 700 is provided with variable angles for the hat webs. In one configuration, the mandrel 700 has a small slope in the areas in which the hat stiffener 404 is desirably configured to handle the shear force S in a more effective manner than the pull-off load C. In another configuration, the mandrel 700 has a large web slope in the areas in which the hat stiffener 404 is desirably configured to handle the pull-off load C in a more effective manner than the shear force S.

The routine 1000 continues from operation 1002 to operation 1004, where the composite material 702 is placed in the mandrel 700. As described above, the composite material 702 may be a matrix formed from various materials, depending on the particular application. The composite material 702 may be placed in the mandrel 700 in one operation or in successive layers, the present technology of which is not limited to any particular configuration. The composite material 702 may be placed and secured in the mandrel 700 in various ways. For example, the composite material 702 may be pressed in the mandrel 700 using a bladder (not shown) that fits in the mandrel 700. The entire assembly, mandrel 700, composite material 702 and bladder, may then be bagged a vacuum may be applied to create pressure in the assembly to force the composite material 702 to the shape of the mandrel 700 during a curing process. The presently disclosed subject matter is not limited to any particular means of securing the composite material 702 in the mandrel 700.

The routine 1000 continues from operation 1004 to operation 1006, where the composite material 702 is cured. The concepts and technologies described herein are not limited to any particular curing process. In some configurations, because of the changing hat web slope profile, it may be advantageous or necessary to vary the temperature or pressure of the mandrel 700 during the curing process along the length of the mandrel 700. Although not confined to any particular reason, the temperature or pressure may be varied to account for additional material that may be present in some areas of the hat stiffener 404 than other areas due to the changing slopes. However, the presently disclosed subject matter is not limited to any particular temperature or pressure profile for curing.

The routine 1000 continues from operation 1006 to operation 1008, where the cured hat stiffener is removed from the mandrel 700. In some configurations, the hat stiffener includes locally optimized hat web slopes formed by the various angles in the mandrel 700 corresponding to the hat webs. It should be understood that the present technology is not limited to any particular removal process. Further, as part of the removal process, some material of the now-cured composite material 702 may be removed to shape the hat stiffener according to a required design configuration. The routine 1000 thereafter ends.

Figure 11:
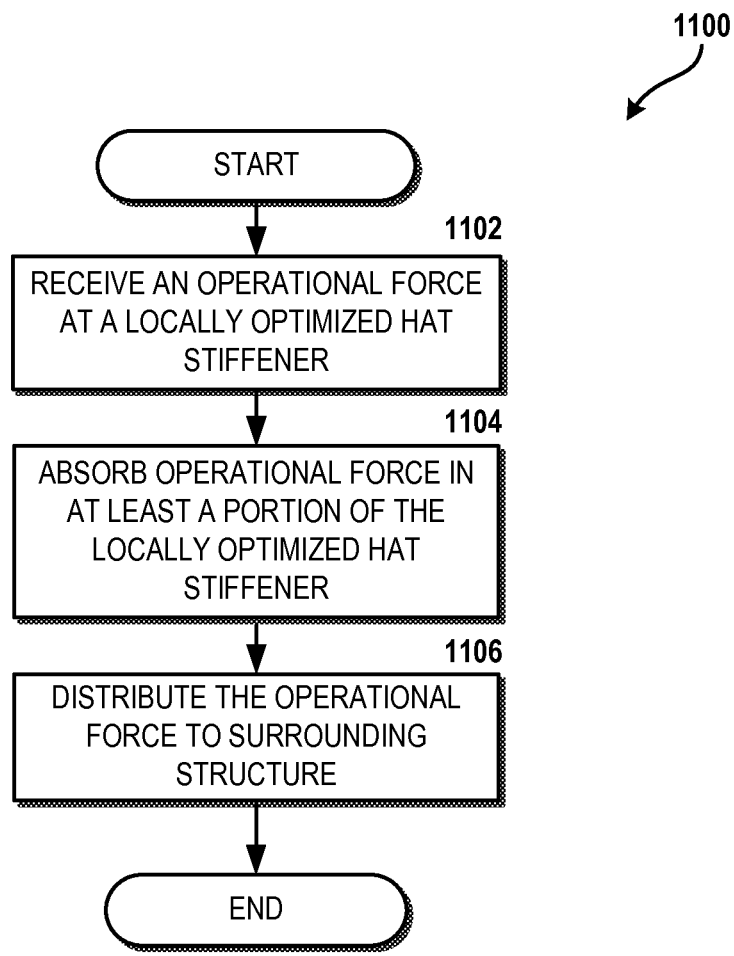
FIG. 11 is an exemplary method for using a locally optimized composite hat stiffener, according to embodiments presented herein.

FIG. 11 is an illustrative routine for using a hat stiffener, according to various embodiments. Routine 1100 begins and proceeds to operation 1102, where an operational force is received at a locally optimized hat stiffener As described above, a locally optimized hat stiffener may perform certain functions. A first function may be to pick up loads applied to the skin, collect the loads, and then transfer those loads onto or into other, more robust structures capable of handling the loads. The loads may be due to various operational forces, including, but not limited to, pressure loading or some other locally applied or distributed loading. The applied load locations, or interfaces with other structures, may be locations that develop a significant amount of pull-off loading. A second function may be to stabilize the skin. The locally optimized hat stiffeners of the present disclosure may do this by supplying out-of-plane stiffness, thereby reducing the likelihood of a panel buckling or failing.

Various configurations of the locally optimized hat stiffeners may have a wide footprint, which may be an effective mechanism for stabilizing a relatively large area of panel. The torsional stiffness and shear stiffness may also help stabilize a panel as well. During pressurization, the hat stiffeners may generally take the pressure load and redistribute it to the surrounding structure. During take-off/landing/maneuvers, the fuselage, and bulkheads in the structure may be subjected to loads. Different areas of the fuselage will see elevated shear loading for different loading scenarios.

Routine 1100 proceeds from operation 1102 to operation 1104, where the locally optimized hat stiffener absorbs (or collects) at least a portion of the operational force. The operational force may be absorbed by more than one locally optimized hat stiffener. Due to local optimization, a hat stiffener according to various configurations described herein may absorb the operational force at various locations along the length of the hat stiffener. For example, a location on the hat stiffener optimized for one type of operational force may not absorb an appreciable amount of the operational force, whereas a location on the hat stiffener optimized for the operational force may absorb a significant portion of the operational force.

Routine 1100 proceeds from operation 1104 to operation 1106, where the absorbed operational forces are distributed to the surrounding structure. The surrounding structure may include, but is not limited to, a frame of the aircraft, other panels, and the like. The routine 1100 thereafter ends.

The subject matter described above is provided by way of illustration only and should not be construed as limiting. Various modifications and changes may be made to the subject matter described herein without following the example embodiments and applications illustrated and described, and without departing from the true spirit and scope of the present disclosure, embodiments of which are set forth in the following claims.

What is claimed is:

1. A hat stiffener, comprising:
a hat cap having a planar hat cap section along a linear portion of the hat cap;
a plurality of hat flanges along the planar hat cap section, each of the plurality of hat flanges being planar; and
a hat web extending between the planar hat cap section and a selected one of the plurality of hat flanges, the hat web including:
a first planar web section at a first location along the planar hat cap section, the first planar web section extending from the planar hat cap section to the selected one of the plurality of hat flanges and having a first slope, and
a second planar web section at a second location along the planar hat cap section, the second planar web section extending from the planar hat cap section to the selected one of the plurality of hat flanges and having a second slope, wherein the second slope is greater than the first slope such that the hat stiffener has a first internal width corresponding to the first slope and a second internal width corresponding to the second slope along the linear portion of the hat cap.

2. The hat stiffener of claim 1, wherein the first slope is configured to withstand a shear force.

3. The hat stiffener of claim 1, wherein the second slope is configured to withstand a pull-off force.

4. The hat stiffener of claim 1, wherein the hat web further comprises a transitional web section having a transitional slope that provides a transition from the first slope to the second slope.

5. The hat stiffener of claim 1, wherein the hat web further comprises a third planar web section at a third location along the planar hat cap section, the third planar web section extending from the planar hat cap section to the selected one of the plurality of hat flanges and having a third slope.

6. The hat stiffener of claim 5, wherein the third slope is the same as the first slope.

7. The hat stiffener of claim 1, wherein a width of the hat cap varies along the planar hat cap section.

8. The hat stiffener of claim 7, wherein the width of the hat cap corresponding to the second slope is greater than the width of the hat cap corresponding to the first slope.

9. A composite structure, comprising:
a composite skin; and
a plurality of hat stiffeners affixed to the composite skin, each of the plurality of hat stiffeners comprising:
a hat cap having a planar hat cap section along a linear portion of the hat cap,
a plurality of hat flanges along the planar hat cap section, each of the plurality of flanges being planar, and
a hat web extending between the planar hat cap section and a selected one of the plurality of flanges, the hat web including:
a first planar web section at a first location along the planar hat cap section, the first planar web section extending from the planar hat cap section to the selected one of the plurality of hat flanges and having a first slope, and
a second planar web section at a second location along the planar hat cap section, the second planar web section extending from the planar hat cap section to the selected one of the plurality of hat flanges and having a second slope, wherein the second slope is greater than the first slope such that the plurality of hat stiffeners has a first internal width corresponding to the first slope and a second internal width corresponding to the second slope along the linear portion of the hat cap.

10. The composite structure of claim 9, wherein the first slope is configured to withstand a shear force.

11. The composite structure of claim 9, wherein the second slope is configured to withstand a pull-off force.

12. The composite structure of claim 9, wherein the hat web further comprises a transitional web section having a transitional slope.

13. The composite structure of claim 12, wherein the transitional slope provides a transition from the first slope to the second slope.

14. The composite structure of claim 9, wherein the hat web further comprises a third planar web section at a third location along the planar hat cap section, the third planar web section extending from the planar hat cap section to the selected one of the plurality of hat flanges and having a third slope.

15. The composite structure of claim 9, wherein a width of the hat cap varies along the planar hat cap section.

16. A hat stiffener, comprising:
a hat cap having a central axis that is linear and having a planar hat cap section;
a hat flange extending parallel to the hat cap along the planar hat cap section; and
a hat web intersecting the planar hat cap section at a first end and intersecting the hat flange at a second end, the hat web including:
a first planar web section at a first cross-section of the hat stiffener at a first position along the planar hat cap section, the first planar web section extending from the planar hat cap section to the hat flange and having a first slope corresponding to a first constant gradient of the hat web from the first end to the second end, and
a second planar web section at a second cross-section of the hat stiffener at a second position along the planar hat cap section, the second planar web section extending from the planar hat cap section to the hat flange and having a second slope corresponding to a second constant gradient of the hat web from the first end to the second end, wherein the second slope is greater than the first slope.

17. The hat stiffener of claim 16, further comprising a third planar web section at a third cross-section of the hat stiffener at a third position along the planar hat cap section, the third planar web section extending from the planar hat cap section to the hat flange and having the first slope corresponding to the first constant gradient.

18. The hat stiffener of claim 17, further comprising:
a first transitional web section between and abutting the first planar web section and the second planar web section, the first transitional web section having a first transitional slope that varies to provide a first transition from the first slope of the first planar web section to the second slope of the second planar web section; and
a second transitional web section between and abutting the second planar web section and the third planar web section, the second transitional web section having a second transitional slope that varies to provide a second transition from the second slope of the second planar web section to the first slope of the third planar web section.

* * * * *